United States Patent [19]

Ohno et al.

[11] 4,247,651
[45] Jan. 27, 1981

[54] PROCESS FOR PREPARING FOAMED SYNTHETIC RESIN PRODUCTS

[75] Inventors: Shigeaki Ohno, Naruto; Nobuyuki Aburatani, Tokushima; Nobuyuki Ueda, Naruto, all of Japan

[73] Assignee: Otsuka Kagaku Yakuhin Kabushiki Kaisha, Japan

[21] Appl. No.: 75,005

[22] Filed: Sep. 12, 1979

Related U.S. Application Data

[63] Continuation of Ser. No. 27,059, Apr. 4, 1979, abandoned.

[51] Int. Cl.³ .............................................. C08J 9/06
[52] U.S. Cl. .............................. 521/92; 264/DIG. 5; 521/95; 521/96; 521/143; 521/144; 521/148; 521/149; 521/909; 521/910
[58] Field of Search .................................. 521/96, 92

[56] References Cited

FOREIGN PATENT DOCUMENTS 52-32978 of 1977 Japan.

Primary Examiner—Morton Foelak
Attorney, Agent, or Firm—Armstrong, Nikaido, Marmelstein & Kubovcik

[57] ABSTRACT

A process for preparing a foamed product from a high-melting synthetic resin by decomposing a blowing agent incorporated in the resin, characterized in that the blowing agent is at least one zinc peroxide represented by the formula:

$$Zn_lO_m \cdot (H_2O)_{n/2}$$

wherein l is an integer of 1 to 10, m is an integer of 2 to 20 and n is 0 or an integer of 1 to 5.

5 Claims, No Drawings

PROCESS FOR PREPARING FOAMED SYNTHETIC RESIN PRODUCTS

This is a continuation, of application Ser. No. 27,059, filed Apr. 4, 1979 now abandoned.

This invention relates to a process for preparing foamed synthetic resin products, and more particularly to a novel process for preparing foamed products from high-melting synthetic resins.

It is well known to prepare foamed products from synthetic resins by decomposing a blowing agent incorporated in the resin. Various blowing agents useful for this application are also known which include, for example, those of the azo, nitroso and hydrazine types. These blowing agents must fulfil the requirements of being decomposable at a specified temperature but capable of remaining chemically as stable as possible at lower temperatures, being decomposable at the highest possible velocity, and leaving substantially no residue when decomposed so as not to produce any color, noxious odor or toxicity.

Such blowing agents are divided into two groups: those useful for low-melting synthetic resins, and those suited to high-melting synthetic resins. While a wide variety of blowing agents of these two categories have heretofore been developed, the latter group includes the blowing agents of the axodicarboxylic acid type. The axodicarboxylic acid-type blowing agents nevertheless have such a low stability against water that they are decomposable even in the presence of the water contained in air, whereas they undergo decomposition very slowly even at the decomposition temperature and leave a residue which produces a color and toxicity.

The main object of this invention is to provide a process for preparing foamed products from high-melting synthetic resins with use of a blowing agent which fulfils the foregoing requirements.

More specifically stated, an object of this invention is to provide a process for preparing foamed synthetic resin products with use of a blowing agent which is rapidly decomposable at a specified temperature to form a structure having uniform minute cells.

Another object of this invention is to provide a process for preparing foamed synthetic resin products with use of a blowing agent which does not leave substantially any residue when decomposed.

Another object of this invention is to provide a process for preparing foamed synthetic resin products which do not have any color, odor or toxicity due to the residue of the blowing agent used.

These objects and features of the invention will become apparent from the following description.

The present invention is characterized in that in preparing a foamed product of high-melting synthetic resin with use of a blowing agent, a zinc peroxide is used as the blowing agent. Thus the invention has been accomplished based on the novel finding that the zinc peroxide meets all the requirements for the blowing agents useful for high-melting synthetic resins.

The zinc peroxides useful as blowing agents in this invention are already known and represented by the following formula (I):

$$Zn_lO_m \cdot (H_2O)_{n/2} \tag{I}$$

wherein l is an integer of 1 to 10, m is an integer of 2 to 20 and n is 0 or an integer of 1 to 5. More specific examples of such compounds are $ZnO_2$, $Zn_2O_3$, $Zn_3O_5$, etc. These compounds are used singly, or at least two of them are usable in admixture. The zinc peroxides useful in this invention are those prepared by any of various methods insofar as they are represented by the formula (I). Typically they are produced, for example, by reacting hydrogen peroxide with zinc oxide or zinc hydroxide, or by reacting a solution of hydrogen peroxide in anhydrous ether with diethylzinc or zinc amide.

The zinc peroxides to be used in this invention, unlike usual peroxides, have a high chemical stability. For example, Table 1 below shows the thermal stability, at 90° C. with the lapse of time, of a zinc peroxide containing 58.4% of $ZnO_2$.

TABLE 1

|  | 24 hr | 74 hr | 120 hr | 240 hr |
|---|---|---|---|---|
| Variation in purity (%) | 58.4 | 58.3 | 58.2 | 58.0 |
| Decomposition (%) | 0 | 0.17 | 0.34 | 0.68 |

Table 1 reveals that the zinc peroxide can be used or preserved in a manner usual with blowing agents without any adverse effect on its thermal stability.

The zinc peroxides useful as blowing agents in this invention decompose usually at a temperature of about 200 to about 260, preferably about 220° to about 240° C. although the decomposition temperature somewhat varies with the kind of the peroxide.

To practice the process of this invention, a high-melting synthetic resin and the specified zinc peroxide are kneaded together in a usual manner. The amount of the zinc peroxide to be used varies, and is therefore determined, in accordance with the kind of the peroxide, the kind of the synthetic resin, the foaming degree of the desired product, etc. Usually 1 to 30 parts by weight, preferably 5 to 10 parts by weight, of the zinc peroxide is used per 100 parts by weight of the synthetic resin. Examples of useful high-melting synthetic resins are a wide variety of those having a melting point of at least 160° C., such as polyamides, polyolefins, polyesters, polycarbonates, ABS resins, polysulfones, etc. According to this invention, the two ingredients are kneaded together conjointly with known additives, such as lubricants, antioxidants, fillers and the like. Examples of useful lubricants are calcium stearate, zinc stearate, and oleyl amide. Examples of useful antioxidants are 3,5-di-tertiary-butyl-4-hydroxy-toluene, dilaurylthiopropionate, 2,6-di-tertiary-butyl phenol, N,N-di-β-naphthyl-p-phenylene diamine. Examples of useful fillers are calcium carbonate, clay, talc, aluminum hydroxide, aluminum silicate, magnesium silicate and glass fiber. These additives are used in usual amounts.

According to this invention, the kneaded mixture is molded by a known method, for example, by injection molding, extrusion molding, blow molding, pressure molding or calender molding. The mixture can be foamed simultaneously with or after molding. The molding conditions are suitably determined in accordance with the molding method and the kind of the resin used. The mixture is foamed by being heated to decompose the blowing agent. The heating temperature, which is suitably determined in accordance with the kinds of the blowing agent and the resin, is usually 220° to 300° C., preferably 230° to 280° C.

The process of this invention will be described below in greater detail with reference to examples. The zinc peroxide used in the examples are prepared by the following method. To an aqueous dispersion prepared by dispersing 405 g (5 mol) of ZnO into 2 l-water is added slowly 580 ml (6 mol) of 35% $H_2O_2$ and then heated at 10° to 40° C. for 6 hours with stirring to produce 440 g of zinc peroxide containing ZnO. The resulting zinc peroxide is divided into fine powders having an average diameter of 3.5 μ.

EXAMPLE 1

One hundred parts by weight of polypropylene (trade mark "NOBLEN", product of Sumitomo Chemical Co., Ltd., Japan) having a density of 0.905 g/cm$^3$, 5 parts by weight of zinc peroxide and 0.3 part by weight of dilaurylthiodipropionate are mixed together in a mixer for 10 minutes. The mixture is extruded at 190° to 230° C. The extrudate obtained is a white foamed product having uniform cells and a foaming degree of 2.9 to 3.5 times.

EXAMPLE 2

To 100 parts by weight of an ABS resin (trade mark: "JSR-ABS-12", product of Japan Synthetic Rubber Co., Ltd., Japan) are added 5 parts by weight of zinc peroxide and 0.3 part by weight of calcium stearate serving as a lubricant. The mixture is passed between two roll mills at 165° to 170° C. to obtain a smooth-surfaced sheet. The sheet is heated at 240° C. for 4 minutes in an electric oven and thereby foamed. The product obtained has numerous closed cells and a density of 0.39 g/cm$^3$.

EXAMPLE 3

To 100 parts by weight of an ABS resin (trade mark: "ABS-15", product of Japan Synthetic Rubber Co., Ltd., Japan) thoroughly dried are added 10 parts by weight of zinc peroxide and 0.3 part by weight of calcium stearate. The mixture is kneaded for 15 minutes in a mixer and then extruded at 160° to 180° C. The extrudate is a white foamed product having closed cells and a foaming degree of 2.6 to 3.2 times.

EXAMPLE 4

To 100 parts by weight of polycarbonate ("UPIRON S-3000", product of Mitsubishi Gas Chemical Co., Ltd., Japan) are added 0.5 part of zinc peroxide and 0.5 part of calcium stearate as a lubricant. The mixture is extruded at 245° C. by an extruder. The extrudate obtained is a white foamed product having a specific gravity of 0.7.

EXAMPLE 5

10 parts by weight of glass fiber is mixed with 90 parts by weight of polyethylene telephthalate and then the resulting mixture is extruded. The extrudate obtained is cut into pellets to which 0.5 part of zinc peroxide and 0.3 part of calcium stearate are added. The mixture is then subjected to injection molding at 270° C. The product obtained has uniform cells.

What is claimed is:

1. A process for preparing a foamed product comprising the steps of:
   (a) incorporating a blowing agent within a high-melting synthetic resin, said blowing agent consisting of a zinc peroxide represented by the formula: $Zn_lO_m\cdot(H_2O)_{n/2}$ wherein l is an integer of from 1 to 10, m is an integer of from 2 to 20 and n is an integer of from 0 to 5;
   (b) decomposing said blowing agent by heating to obtain a foamed product; and
   (c) allowing said foamed product to cool.
2. The process for preparing a foamed product according to claim 1 wherein said zinc peroxide is selected from the group consisting of of $ZnO_2$, $Zn_2O_3$ and $Zn_3O_5$.
3. The process for preparing a foamed product according to claim 1 wherein said zinc peroxide has a decomposition temperature of about 200° to about 260° C.
4. The process for preparing a foamed product according to claim 3 wherein said decomposition temperature is about 220° to about 240° C.
5. The process for preparing a foamed body according to claim 1 wherein said zinc peroxide is use in an amount of 1 to 30 parts by weight per 100 parts by weight of the resin.

* * * * *